United States Patent
Pickford

(10) Patent No.: US 10,006,366 B2
(45) Date of Patent: Jun. 26, 2018

(54) FUEL RECIRCULATION THERMAL MANAGEMENT SYSTEM

(71) Applicant: United Technologies Corporation, Hartford, CT (US)

(72) Inventor: Simon Pickford, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 475 days.

(21) Appl. No.: 14/697,880

(22) Filed: Apr. 28, 2015

(65) Prior Publication Data

US 2017/0058774 A1    Mar. 2, 2017

(51) Int. Cl.
*F02C 7/16* (2006.01)
*F28F 27/02* (2006.01)
*F02C 7/224* (2006.01)
*F02C 9/32* (2006.01)

(52) U.S. Cl.
CPC .............. *F02C 7/16* (2013.01); *F02C 7/224* (2013.01); *F02C 9/32* (2013.01); *F28F 27/02* (2013.01); *Y02T 50/675* (2013.01)

(58) Field of Classification Search
CPC ..... F02C 7/16; F02C 7/224; F02C 9/32; F28F 27/02; Y02T 50/675
See application file for complete search history.

(56) References Cited

U.S. PATENT DOCUMENTS

| 4,020,632 A | * | 5/1977 | Coffinberry | F02C 7/22 123/41.33 |
| 7,984,606 B2 | * | 7/2011 | Smith | F02C 7/224 60/266 |

* cited by examiner

Primary Examiner — Mary A Davis
(74) Attorney, Agent, or Firm — Snell & Wilmer L.L.P.

(57) ABSTRACT

The present disclosure provides systems and methods related to thermal management systems for gas turbine engines. For example, a thermal management system comprises a fuel circuit, comprising a burn line and a recirculation line, and a burn line fuel-oil cooler, coupled to the burn line and an oil circuit. The oil circuit comprises a sending portion, configured to carry oil from the burn line fuel-oil cooler to an engine lube system, and a returning portion, configured to carry oil from the engine lube system to the burn line fuel-oil cooler. The thermal management system further comprises a recirculation fuel-oil cooler, coupled to the recirculation line and the returning portion, and an air-fuel cooler coupled to the recirculation line.

16 Claims, 4 Drawing Sheets

FUEL RECIRCULATION THERMAL MANAGEMENT SYSTEM

GOVERNMENT LICENSE RIGHTS

This disclosure was made with Government support under Contract No. FA8650-09-D-2923-AETD awarded by the United States Air Force. The U.S. Government has certain rights in the disclosure.

FIELD OF THE DISCLOSURE

The present disclosure relates to thermal management systems for gas turbine engines, and more particularly, to thermal management systems utilizing a fuel recirculation circuit.

BACKGROUND OF THE DISCLOSURE

Gas turbine engines typically include at least a compressor section, a combustor section, and a turbine section, disposed about an axial centerline and arranged in flow series with an upstream inlet at the compressor section and a downstream exhaust at the turbine section. As compressed air passes from the compressor section to the combustor section, it is mixed with fuel and burned. As hot combustion gases expand, they are converted to work by the turbine section, supplying power to the engine and other engine loads.

The heat generated by a gas turbine engine may be managed by a thermal management system. Thermal management systems may utilize engine fluids such as fuel and oil to cool the engine by transferring excess engine heat overboard. Above certain temperature limits, engine oil may undergo coking and fuel may undergo lacquering. Such oil and fuel temperature limits may limit the heat sink capacity of thermal management systems.

SUMMARY OF THE DISCLOSURE

In various embodiments, the present disclosure provides thermal management systems utilizing fuel recirculation and a recirculation fuel-oil cooler. In various embodiments, a thermal management system may increase heat sink capacity, decrease fuel recirculation volume and/or flow rate, and/or maintain engine fluids within temperature limits. For example, in various embodiments, a thermal management system comprises an oil circuit, a fuel circuit, comprising a burn line and a recirculation line, and a burn line fuel-oil cooler. The thermal management system further comprises a recirculation fuel-oil cooler, coupled to the recirculation line and the oil circuit, and an air-fuel cooler coupled to the recirculation line. In various embodiments, the thermal management system may further comprise a fuel throttle valve. In various embodiments, the thermal management system may further comprise at least one sensor and/or a controller in communication with the sensor. In various embodiments, the oil circuit may comprise a bypass valve, bypass line, and cooling line. In various embodiments, the thermal management system may comprise an integrated heat exchanger.

In various embodiments, the present disclosure provides methods for transferring heat in a thermal management system comprising circulating a volume of fuel in a fuel circuit and circulating a volume of oil in an oil circuit. The methods may further comprise transferring heat from the volume of oil to the volume of fuel and dividing the volume of fuel such that a first portion of fuel is communicated to a combustion section and a second portion of fuel is communicated into a recirculation line. The methods may further comprise transferring heat from the volume of oil to the second portion of fuel in a recirculation fuel-oil cooler and transferring heat from the second portion of fuel to air. In various embodiments, methods may further comprise transferring air externally from the thermal management system. In various embodiments, the methods may further comprise determining, by a controller, a fuel temperature and/or an oil temperature, comparing the fuel temperature and/or an oil temperature to a threshold temperature, and adjusting the flow rate or volume of fuel and/or oil in a thermal management system.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods and devices may find particular use in connection with gas turbine engines. However, various aspects of the disclosed embodiments may be adapted for optimized performance in a variety of engines. As such, numerous applications of the present disclosure may be realized.

Figure 1:
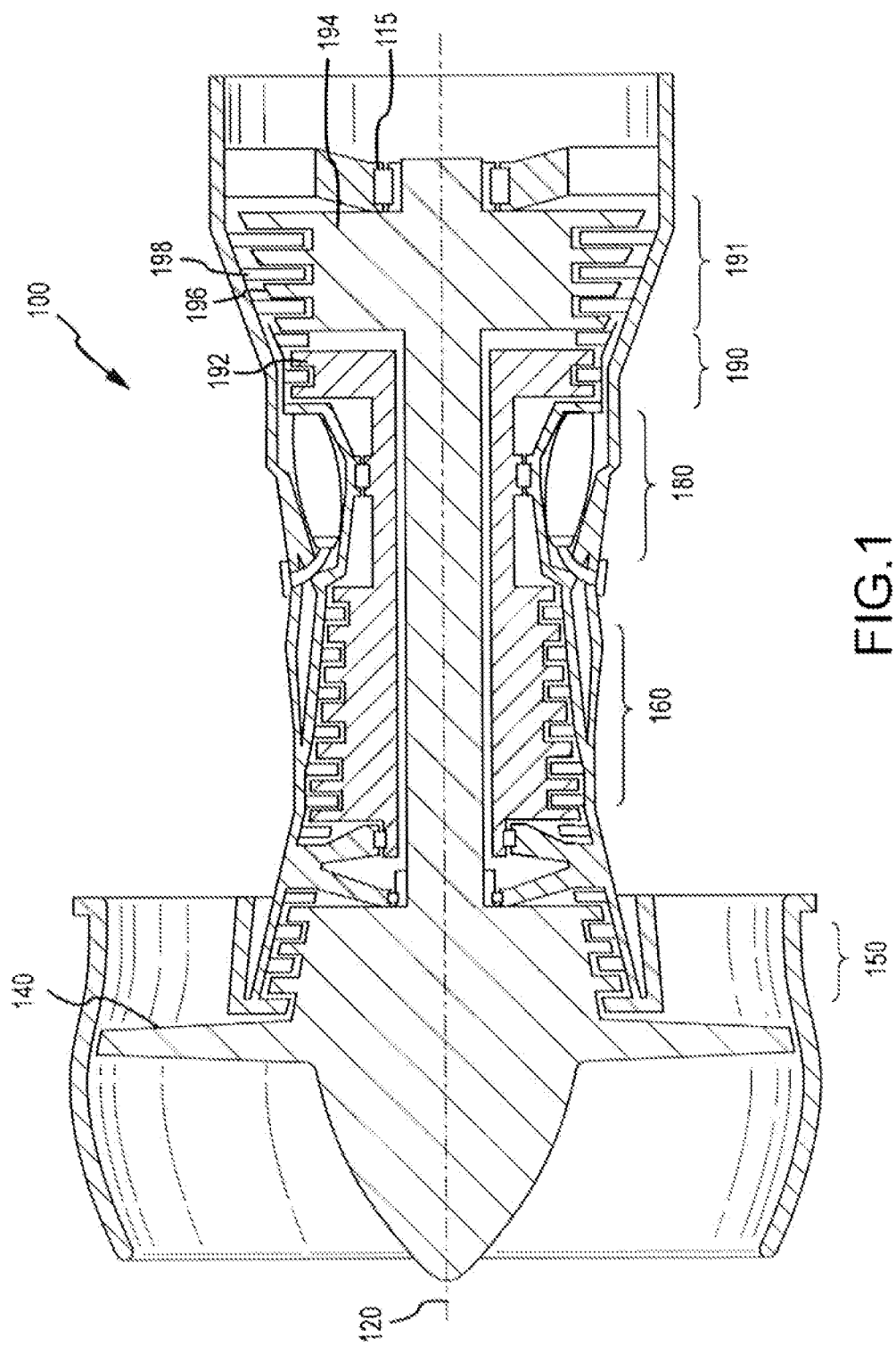
FIG. 1 illustrates a schematic cross-section view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axial centerline axis of rotation 120. Gas turbine engine 100 may comprise a fan 140, compressor sections 150 and 160, a combustion section 180, and turbine sections 190, 191. The fan 140 may drive air into compressor sections 150, 160, which further drive air along a core flow path for compression and communication into the combustion section 180. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of applications and to all types of turbine engines, including turbofan engines, turboprop engines, and turbojet engines.

Multiple sections of the gas turbine engine 100 generate heat during engine operation, including the fan 140, the compressor sections 150, 160, the combustion section 180, the turbine sections 190, 191, and mechanical components such as bearings 115 and gearboxes (not shown). The heat may be carried by fluids that are communicated throughout these and other portions of the engine 100. For example, fuel and oil may be circulated throughout the gas turbine engine 100 and carry a portion of the heat generated during engine operation.

A gas turbine engine may further comprise a thermal management system. Thermal management systems may utilize engine oil and/or fuel to transfer heat from various portions of the engine to other portions of the engine or areas external to the engine. For example, an oil circulation system and a fuel circulation system may have primary functions exclusive of their functions in the thermal management system. For example, oil may function primarily as a lubricant of various engine components (i.e., oil's primary function); fuel may function primarily as an energy source (i.e., fuel's primary function).

The oil and fuel circulation systems may carry oil and fuel to various portions of the engine to operate as heat sinks in a thermal management system. However, the heat sink capacity of the thermal management system may be limited by temperature limits related to oil's primary function and/or fuel's primary function. As used herein, heat sink capacity may be understood to be a quantity of heat per unit of time capable of being absorbed and/or dissipated by the thermal management system.

In various embodiments, a thermal management system may comprise a fuel circuit and an oil circuit. The thermal management system may be configured to circulate fuel in the fuel circuit and to circulate oil in the oil circuit. In various embodiments, the thermal management system may be configured such that heat is transferred from the engine to oil, heat is transferred from the oil to fuel, heat is transferred from the fuel to air, and air is transferred externally from the engine or externally from the thermal management system.

In various embodiments, heat may be transferred in at least one heat exchanger. Various heat exchangers may be incorporated into the thermal management system including, without limitation, gas to liquid heat exchangers and liquid to liquid heat exchangers. Gas to liquid heat exchangers may be configured to heat or cool liquid by exposing it to gas having a different temperature than the liquid. In various embodiments, liquids carrying engine heat may be cooled by exposure to external engine air, air bled from various portions of the engine ("bleed air"), or any other source of air lower in temperature than the heat-carrying liquid. In various embodiments, liquids may be heated by exposure to external engine air, bleed air, or any other source of air higher in temperature than the liquid. Liquid to liquid heat exchangers may be configured to heat or cool a first liquid by exposing it to a second liquid having a different temperature than the first liquid.

In various embodiments, thermal management system 200 may comprise at least one heat exchanger. In various embodiments, the heat exchanger may comprise a fuel-oil cooler and/or an air-fuel cooler. In various embodiments, thermal management system 200 may comprise a burn line fuel-oil cooler 230, a recirculation line fuel-oil cooler 240, and an air-fuel cooler 250. In various embodiments, burn line fuel-oil cooler 230 and recirculation line fuel-oil cooler 240 may be configured to cool oil by exposing it to fuel having a lower temperature than the oil. Such exposure may occur without combining, mixing, or contaminating the oil with the fuel. Stated another way, oil and fuel may come into thermal contact without coming into physical contact in burn line fuel-oil cooler 230 and recirculation line fuel-oil cooler 240. In various embodiments, air-fuel cooler 250 may be configured to cool fuel by exposing it to air having a lower temperature than the fuel. Such exposure may occur without combining, mixing, or contaminating the fuel with the air. Stated another way, fuel and air may come into thermal contact without coming into physical contact in air-fuel cooler 250.

In various embodiments, the fuel circuit may comprise a burn line 210 and a fuel recirculation line 212. Burn line 210 may be disposed between an aircraft fuel tank 214 and the combustion section 180 of an engine. Burn line 210 may be configured to carry fuel from aircraft fuel tank 214 to combustion section 180. In various embodiments, recirculation line 212 may be in in fluid communication with burn line 210 and disposed between burn line 210 and aircraft fuel tank 214. Recirculation line 212 may be configured to carry fuel from burn line 210 back to fuel tank 214, thereby creating a circuit.

In various embodiments, oil circuit 220 may be configured to circulate oil between thermal management system 200 and an engine lube system 260. In various embodiments, oil circuit 220 may comprise a sending portion and a returning portion. The sending portion may be configured to carry oil from burn line fuel-oil cooler 230 to engine lube system 260. The returning portion may be configured to carry oil from engine lube system 260 to burn line fuel-oil cooler 230. In various embodiments, engine lube system 260 may generate heat that is transferred to oil circulating in oil circuit 220.

In various embodiments, heat may be transferred by burn line fuel-oil cooler 230 from oil circulating in oil circuit 220 to fuel being carried through burn line 210. In various embodiments, burn line fuel-oil cooler 230 may be disposed on, and coupled to burn line 210 and oil circuit 220. In various embodiments, burn line fuel-oil cooler 230 may comprise a tubular heat exchanger. However, burn line fuel-oil cooler 230 may comprise any suitable heat exchanger, such as a plate heat exchanger, a tube and shell heat exchanger, a plate-fin heat exchanger, microchannel heat exchanger, and the like.

In various embodiments, thermal management system 200 may further comprise a fuel throttle valve 216 disposed on, and coupled to, burn line 210 and recirculation line 212. In various embodiments, fuel throttle valve 216 may be disposed downstream of burn line fuel-oil cooler 230 on burn line 210. In various embodiments, fuel throttle valve 216 may be configured to adjustably control the flow of fuel from burn line 210 to recirculation line 212. For example, in various embodiments, in response to the fuel throttle valve being in a closed position, communication of fuel into recirculation line 212 may be prevented. For example, in various embodiments, in response to the fuel throttle valve being in a partially open position, a first portion of fuel may be communicated through burn line 210 to combustion portion 180, and a second portion of fuel may be communicated through recirculation line 212 to aircraft fuel tank 214.

In various embodiments, heat may be transferred by recirculation fuel-oil cooler 240 from oil circulating in the returning portion to fuel circulating in recirculation line 240. In various embodiments, recirculation fuel-oil cooler 240 may be disposed on, and coupled to recirculation line 212 and returning portion of oil circuit 220. In various embodiments, recirculation fuel-oil cooler 240 may comprise a tubular heat exchanger. However, recirculation fuel-oil cooler 240 may comprise any suitable heat exchanger, such as a plate heat exchanger, a tube and shell heat exchanger, a plate-fin heat exchanger, microchannel heat exchanger, and the like.

In various embodiments, heat may be transferred by air-fuel cooler 250 from fuel circulating in recirculation line 240 to air. In various embodiments, air-fuel cooler 250 may be disposed on and coupled to recirculation line 212. In various embodiments, air-fuel cooler 250 may comprise an airframe mounted heat exchanger. However, air-fuel cooler 250 may comprise any suitable heat exchanger.

In various embodiments, transferring heat from oil circulating in the returning portion to fuel circulating in recirculation line 240 upstream of air-fuel cooler 250 may increase the heat sink capacity of thermal management system 200. In various embodiments, transferring heat from oil circulating in the returning portion to fuel circulating in recirculation line 240 upstream of air-fuel cooler 250 may decrease the volume and/or flow rate of fuel communicated into recirculation line 212.

Figure 2A:
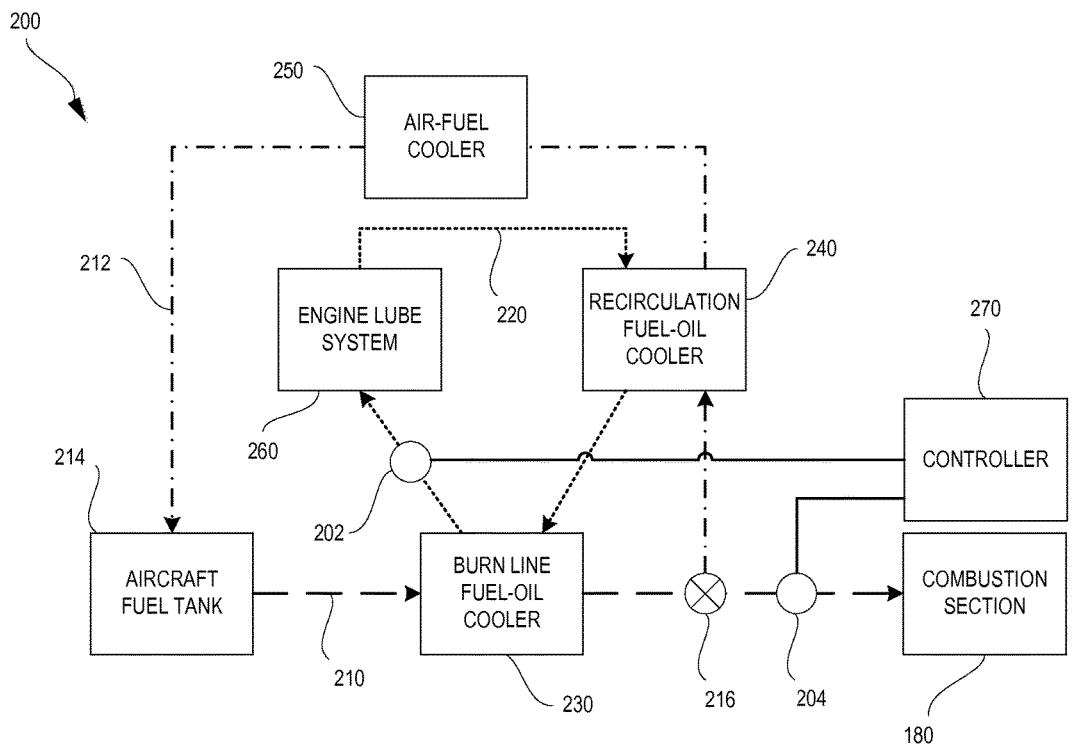
FIG. 2a illustrates a schematic diagram of a thermal management system in accordance with various embodiments.
Figure 2B:
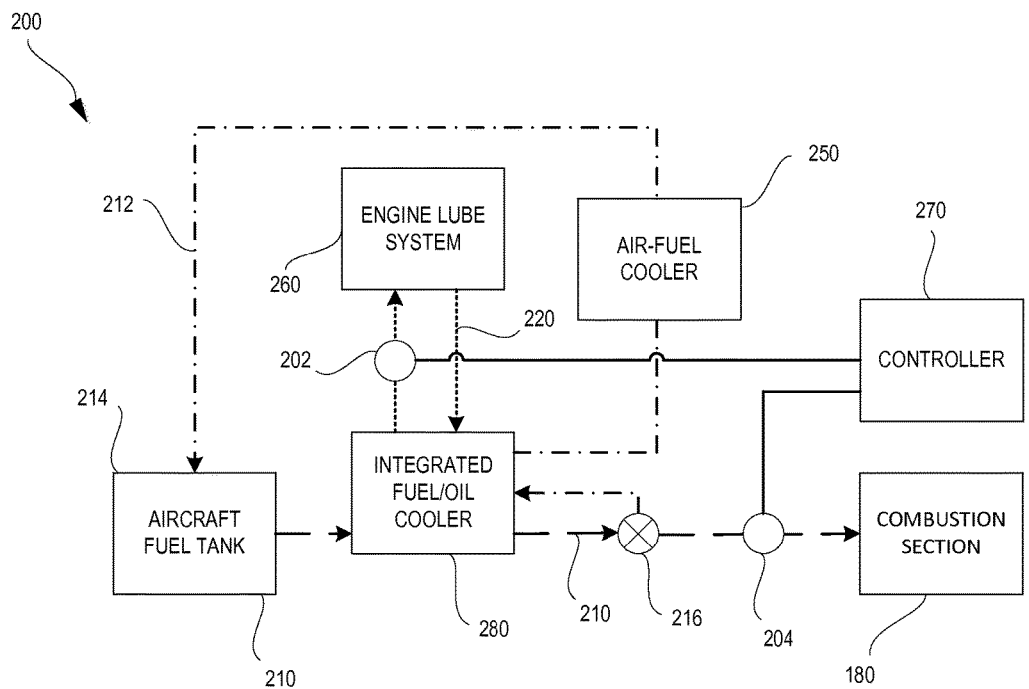
FIG. 2b illustrates a schematic diagram of another thermal management system in accordance with various embodiments.

In various embodiments, and with reference to FIG. 2b, thermal management system 200 may comprise an integrated fuel-oil cooler 280. In various embodiments, integrated fuel-oil cooler 280 may comprise a burn line fuel-oil cooler 230 and a recirculation fuel-oil cooler 240, as previously described.

In various embodiments and with reference to FIGS. 2a and 2b, thermal management system 200 may further comprise at least one sensor. In various embodiments, the sensor may comprise a temperature sensor. In various embodiments, the sensor may comprise a flow sensor and/or a flow meter. In various embodiments, thermal management system 200 may further comprise a first sensor 202 disposed at a first location. In various embodiments, first sensor 202 may be disposed on and coupled to oil circuit 220. In various embodiments, the first location may be on oil circuit 220 downstream of burn line fuel-oil cooler 230 and upstream of engine lube system 260. In various embodiments, thermal management system 200 may further comprise a second sensor 204 disposed at a second location. In various embodiments, second sensor 204 may be disposed on and coupled to burn line 210. In various embodiments, the second location may be on burn line 210 downstream of burn line fuel-oil cooler 230. In various embodiments, the second location may be on burn line 210 downstream of burn line fuel-oil cooler 230 and fuel throttle valve 216.

In various embodiments, at least one of first sensor 202 and second sensor 204 may be coupled to, and/or in communication with, a controller 270. In various embodiments, controller 270 may comprise a full authority digital engine control ("FADEC") system. Controller 270 may comprise a processor configured to implement various logical operations in response to execution of instructions, for example, instructions stored on a non-transitory, tangible, computer-readable medium.

As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101. In various embodiments, the processor may be configured to implement algorithms to derive, calculate, and/or determine the temperature of fuel and/or oil in response to receiving, from at least one of first sensor 202 and second sensor 204, a temperature and/or flow rate measurement.

In various embodiments, thermal management system 200 may be configured to maintain a temperature of fuel at or below a maximum desired fuel temperature by increasing a rate of fuel flow. In various embodiments, the maximum desired fuel temperature may be predetermined. In various embodiments, a threshold fuel temperature may be predetermined and may comprise a temperature lower than the maximum desired fuel temperature. In various embodiments, the threshold fuel temperature may comprise a temperature at which the rate of fuel flow in the fuel circuit is increased in order to prevent fuel from reaching a temperature at or exceeding the maximum desired fuel temperature.

In various embodiments, thermal management system 200 may be configured to maintain a temperature of oil at or below a maximum desired oil temperature by increasing a rate of fuel flow. In various embodiments, the maximum desired oil temperature may be predetermined. In various embodiments, a threshold oil temperature may be predetermined and may comprise a temperature lower than the maximum desired oil temperature. In various embodiments, the threshold oil temperature may comprise a temperature at which the rate of fuel flow in the fuel circuit is increased in order to prevent oil from reaching a temperature at or exceeding the maximum desired oil temperature.

Figure 3A:
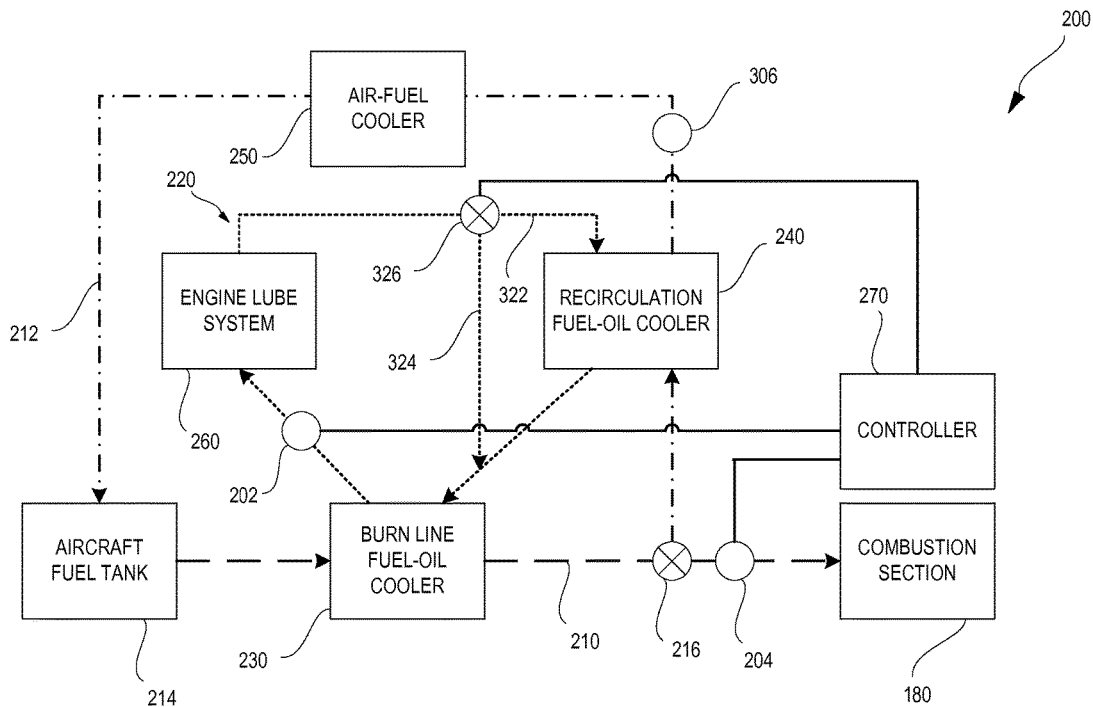
FIG. 3a illustrates a schematic diagram of yet another thermal management system in accordance with various embodiments.

In various embodiments and with reference to FIG. 3a, thermal management system 300 may comprise a bypass system configured to prevent fuel from reaching a temperature at or exceeding the maximum desired fuel temperature. In various embodiments, the returning portion of oil circuit 220 may comprise a bypass valve 326, a bypass line 324, and a cooling line 322. In various embodiments, bypass valve 326 may be disposed on, and coupled to, returning portion of oil circuit 220, bypass line 324, and cooling line 322. In various embodiments, bypass valve 326 may be configured to adjustably control the flow of oil from returning portion to at least one of cooling line 322 and bypass line 324.

In various embodiments, bypass valve 326 may comprise a thermal valve such as a wax thermostatic element or a bimetallic thermostatic element. In various embodiments, bypass valve 326 may comprise an electromechanical valve such as a solenoid operated valve. However, bypass valve 326 may comprise any valve suitable for use in thermal management system 300. In various embodiments, controller 270 may be in communication with bypass valve 326 and may command bypass valve 326 to open and/or close.

In various embodiments, cooling line 322 may be in fluid communication with oil circuit 220. In various embodiments, cooling line 322 may be disposed between bypass valve 326 and burn line fuel-oil cooler 230. In various embodiments, cooling line 322 may be configured to communicate oil from bypass valve 326, through recirculation fuel-oil cooler 240, and towards burn line fuel-oil cooler 230.

In various embodiments, bypass line 324 may be in fluid communication with oil circuit 220. In various embodiments, bypass line 324 may be disposed between bypass valve 326 and burn line fuel-oil cooler 230. In various embodiments, bypass line 324 may be configured to communicate oil from bypass valve 326, towards burn line fuel-oil cooler 230, without communicating oil through recirculation fuel-oil cooler 240. Stated differently, in various embodiments, bypass line 324 may communicate oil substantially in parallel with cooling line 322, and externally of recirculation fuel-oil cooler 240. As used herein, the term parallel should be understood to describe a first flow path which shares a starting and ending terminus with a second flow path, but through which flow is mutually exclusive of flow through the second flow path.

In various embodiments, bypass line 324 and cooling line 322 may integrate, reunite, and/or regain mutual fluid communication in the returning portion downstream of recirculation fuel-oil cooler 240 and upstream of burn line fuel-oil cooler 230.

In various embodiments, communication of oil through bypass line 324 may increase the heat sink capacity of thermal management system 300. In various embodiments, communication of oil through bypass line 324 may maintain oil and/or fuel temperature within predetermined limits.

Figure 3B:
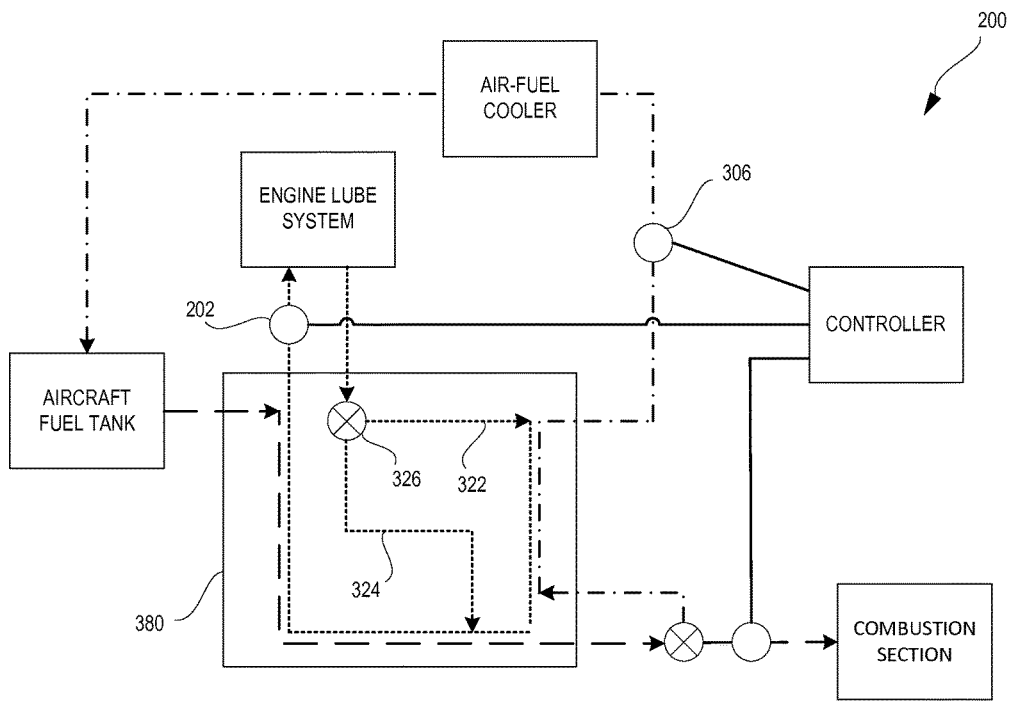
FIG. 3b illustrates a schematic diagram of yet another thermal management system in accordance with various embodiments.

In various embodiments, and with reference to FIG. 3b, thermal management system 300 may comprise an integrated bypass fuel-oil cooler 380. In various embodiments, integrated bypass fuel-oil cooler 380 may comprise a burn line fuel-oil cooler 230, a recirculation fuel-oil cooler 240, a bypass valve 326, a bypass line 324, and a cooling line 322, as previously described.

In various embodiments, and with reference to FIGS. 3a and 3b, thermal management system may further comprise a third sensor 306 disposed at a third location. In various embodiments, third sensor 306 may comprise a temperature sensor. In various embodiments, third sensor 306 may comprise a flow sensor and/or a flow meter. In various embodiments, third sensor 306 may be disposed on and coupled to recirculation line 212. In various embodiments, the third location may be on recirculation line 212 downstream of recirculation fuel-oil cooler 240 and upstream of air-fuel cooler 250.

In various embodiments, third sensor 306 may be coupled to, and/or in communication with, controller 270. In various embodiments, controller 270 may comprise a processor configured to implement various logical operations in response to execution of instructions, for example, instructions stored on a non-transitory, tangible, computer-readable medium. In various embodiments, the processor may be configured to implement algorithms to derive, calculate, and/or determine the temperature of fuel in response to receiving, from third sensor 306, a temperature and/or flow rate measurement. In various embodiments, thermal management system 300 may be configured to maintain a temperature of fuel at or below a maximum desired fuel temperature by communicating oil through bypass line 324.

Figure 4:
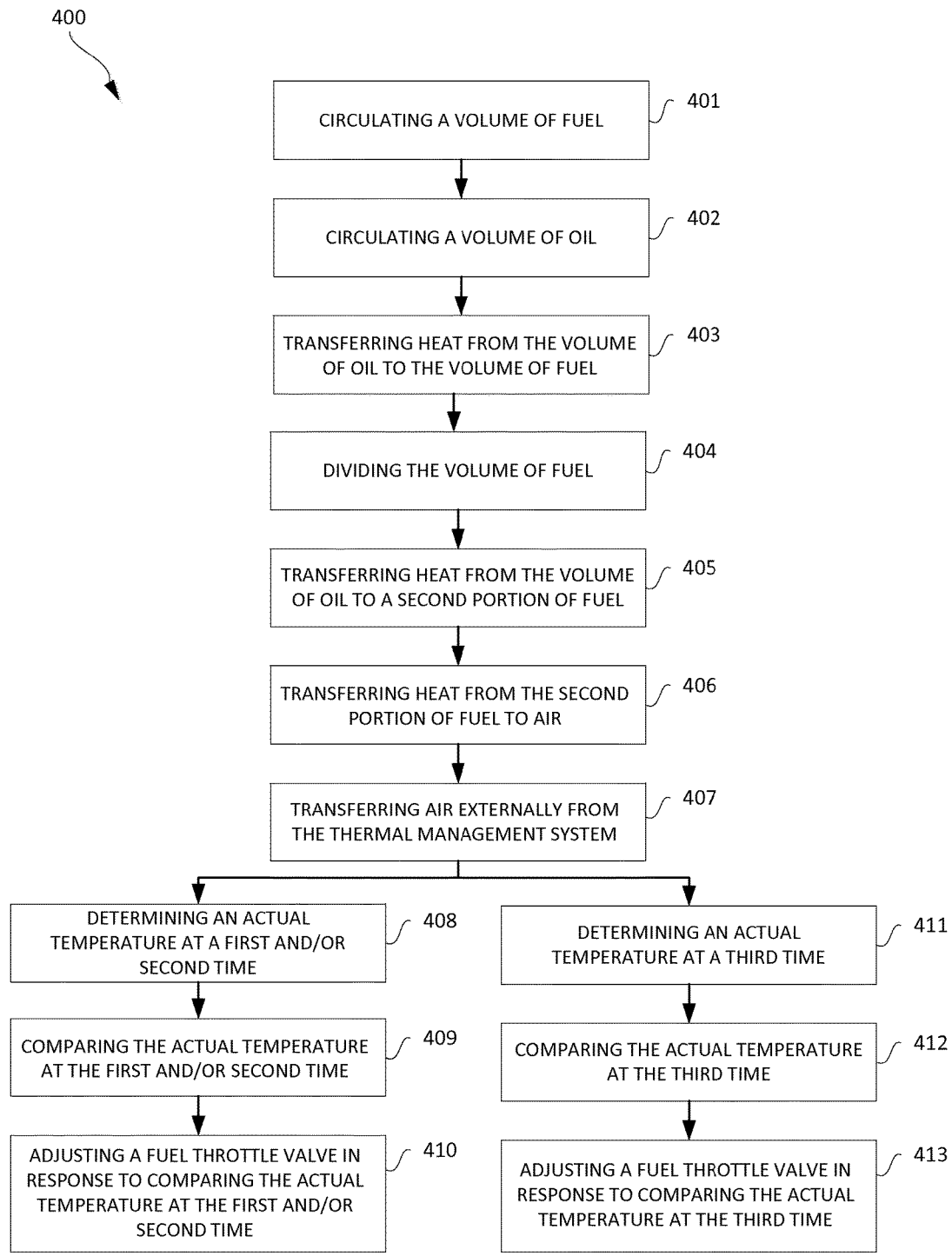
FIG. 4 illustrates a method of transferring heat in a thermal management system in accordance with various embodiments.

In various embodiments and with reference to FIG. 4, a method of transferring heat in a thermal management system comprises circulating a volume of fuel in the fuel circuit (Step 401), and circulating a volume of oil in in oil circuit 220 (Step 402). In various embodiments, the fuel circuit may comprise a burn line 210 and a recirculation line 212. In various embodiments, oil circuit 220 may comprise a sending portion and a returning portion. Oil and fuel may be communicated to burn line fuel-oil cooler 230. In various embodiments, method 400 may further comprise transferring heat from the volume of oil to the volume of heat in burn line fuel-oil cooler 230 (Step 403).

In various embodiments, method 400 may further comprise dividing the volume of fuel (Step 404). The volume of fuel may be divided at fuel throttle valve 216 into a first portion of fuel and a second portion of fuel. In various embodiments, the first portion of fuel may be communicated into recirculation line 212 and the second portion may be communicated towards a combustion section 180. In various embodiments, a position of fuel throttle valve 216 may determine the quantity of fuel communicated into recirculation line 212 and the quantity of fuel communicated towards combustion section 180.

Oil and the second portion of fuel may be communicated to recirculation fuel-oil cooler 240. In various embodiments, method 400 may further comprise transferring heat from the volume of oil to the second portion of fuel in recirculation fuel-oil cooler 240 (Step 405). The second portion of fuel may be communicated to air-fuel cooler 250. In various embodiments, method 400 may further comprise transferring heat from the second portion of fuel to air in air-fuel cooler 250 (Step 406). In various embodiments, method 400 may further comprise transferring air externally from the thermal management system (Step 407).

In various embodiments, method 400 may further comprise adjusting the volume and/or flow rate of fuel and/or oil in order to maintain fuel temperature and oil temperature within predetermined limits. In various embodiments, method 400 may further comprise receiving, by a controller, at least one of an actual oil temperature at the first location and an actual combustion fuel temperature at the second location (Step 408). The actual oil temperature may comprise a temperature of oil at the first location at a first time. The actual combustion fuel temperature may comprise a temperature of fuel at the second location at a second time. The first time may be before, simultaneous with, or after the second time.

In various embodiments, method 400 may further comprise comparing, by the controller, at least one of the actual oil temperature to a threshold oil temperature and the actual combustion fuel temperature to a threshold fuel temperature (Step 409). In various embodiments, controller 270 may derive the actual combustion fuel temperature and/or the actual oil temperature using algorithms.

In various embodiments, method 400 may further comprise adjusting fuel throttle valve 216 (Step 410). In various embodiments, fuel throttle valve 216 may adjust in response to a command from controller 270. In various embodiments, fuel throttle valve 216 may adjust such that the volume and/or flow rate of fuel being communicated into recirculation line 212 is increased in response to at least one of the actual oil temperature exceeding the threshold oil temperature and the actual fuel temperature exceeding the threshold fuel temperature. In various embodiments, fuel throttle valve 216 may adjust such that the volume and/or flow rate of fuel being communicated through burn line fuel-oil cooler 230 is increased in response to at least one of the actual oil temperature exceeding the threshold oil temperature and the actual fuel temperature exceeding the threshold fuel temperature.

In various embodiments, method 400 may further comprise receiving, by a controller, an actual recirculation fuel temperature at the third location (Step 411). The actual recirculation fuel temperature may comprise a temperature of fuel at the third location at a third time. The third time may be before, simultaneous with, or after the first time and/or the second time. [please make the descriptions of 408-410 different than 411-413].

In various embodiments, method 400 may further comprise comparing, by the controller, the actual recirculation fuel temperature to a threshold fuel temperature (Step 412). In various embodiments, controller 270 may derive the actual recirculation fuel temperature using algorithms.

In various embodiments, method 400 may further comprise adjusting bypass valve 326 (Step 413). In various embodiments, bypass valve 326 may adjust in response to a command from controller 270. In various embodiments, bypass valve 326 may adjust such that the volume and/or flow rate of fuel being communicated into bypass line 324 is increased in response to the actual fuel recirculation temperature exceeding the threshold fuel temperature.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thermal management system, comprising:
    a fuel circuit, comprising a burn line and a recirculation line;
    a burn line fuel-oil cooler, coupled to the burn line and an oil circuit, comprising:
        a sending portion, configured to carry oil from the burn line fuel-oil cooler to an engine lube system; and
        a returning portion, configured to carry oil from the engine lube system to the burn line fuel-oil cooler;
    a recirculation fuel-oil cooler, coupled to the recirculation line and the returning portion;
    an air-fuel cooler coupled to the recirculation line; and
    a fuel throttle valve disposed on the fuel circuit and configured to adjustably communicate fuel from the burn line into the recirculation line;
    wherein the fuel circuit is configured to carry fuel from a fuel feed tank, through the burn line, and to the fuel throttle valve, at which a first portion of fuel is directed through the burn line and a second portion of fuel is optionally directed through the recirculation line, returning to the fuel feed tank; and
    wherein the returning portion comprises:
        a cooling line, coupled to, and configured to carry oil through, the recirculation fuel-oil cooler towards the burn line fuel-oil cooler; and
        a bypass line, configured to carry oil towards the burn line fuel-oil cooler, substantially in parallel with the cooling line, and externally of the recirculation fuel-oil cooler.

2. The thermal management system of claim 1, further comprising:
    a first sensor, disposed on the oil circuit downstream of the burn line fuel-oil cooler and upstream of the recirculation fuel-oil cooler; and
    a second sensor, disposed on the burn line downstream of the fuel throttle valve.

3. The thermal management system of claim 2, wherein an integrated heat exchanger comprises the burn line fuel-oil cooler and the recirculation fuel-oil cooler.

4. The thermal management system of claim 2, further comprising a bypass valve disposed on the returning portion and configured to adjustably control a flow of oil from the returning portion into at least one of the cooling line and the bypass line.

5. The thermal management system of claim 4, wherein the bypass valve comprises a thermal valve.

6. The thermal management system of claim 4, wherein the bypass valve comprises an electromechanical valve.

7. The thermal management system of claim 4, further comprising a third sensor, disposed on the recirculation line downstream of the recirculation fuel-oil cooler.

8. The thermal management system of claim 7, wherein at least one of the first sensor, the second sensor, and the third sensor is in communication with a controller.

9. The thermal management system of claim 8, wherein the controller comprises a full authority digital engine control system.

10. The thermal management system of claim 7, wherein an integrated bypass heat exchanger comprises the burn line fuel-oil cooler, the recirculation fuel-oil cooler, the bypass valve, the bypass line, and the cooling line.

11. The thermal management system of claim 10, wherein at least one of the burn line fuel-oil cooler and the recirculation fuel-oil cooler comprises a tubular heat exchanger.

12. A method of transferring heat in a thermal management system, comprising:
    circulating a volume of fuel in a fuel circuit, comprising a burn line and a recirculation line;
    circulating a volume of oil in an oil circuit, comprising a sending portion and a returning portion;
    transferring heat from the volume of oil to the volume of fuel in a burn line fuel-oil cooler coupled to the burn line;
    dividing the volume of fuel, such that a first portion of fuel is communicated through a fuel throttle valve to a combustion section and a second portion of fuel is communicated through the fuel throttle valve and into the recirculation line;
    transferring heat from the volume of oil to the second portion of fuel in a recirculation fuel-oil cooler coupled to the recirculation line and the returning portion;
    transferring heat from the second portion of fuel to air in an air-fuel cooler coupled to the recirculation line;
    determining, by a controller, an actual fuel temperature at a third location;
    comparing, by the controller, the actual fuel temperature to a threshold fuel recirculation temperature; and
    adjusting, by the controller, a bypass valve in response to the actual fuel temperature exceeding the threshold fuel recirculation temperature, wherein the bypass valve is disposed in the returning portion, wherein adjusting the bypass valve comprises controlling a flow of the volume of oil from the returning portion to at least one of:
        a cooling line, coupled to, and configured to carry oil through, the recirculation fuel-oil cooler towards a burn line fuel-oil cooler; and
        a bypass line, configured to carry oil towards the burn line fuel-oil cooler, substantially in parallel with the cooling line, and externally of the recirculation fuel-oil cooler.

13. The method of claim 12, further comprising:
transferring the air externally from the thermal management system.

14. The method of claim 12, further comprising:
determining, by a controller, at least one of an actual oil temperature at a first location and a second actual fuel temperature at a second location;
comparing, by the controller, at least one of the actual oil temperature to a threshold oil temperature and the second actual fuel temperature to a threshold fuel burn temperature; and
adjusting, by the controller, the fuel throttle valve in response to at least one of the actual oil temperature exceeding the threshold oil temperature and the second actual fuel temperature exceeding the threshold fuel burn temperature.

15. The method of claim 14, wherein at least one of the actual oil temperature and the second actual fuel temperature is derived by the controller.

16. The method of claim 12, wherein the actual fuel temperature is derived by the controller.

* * * * *